Sept. 21, 1948.  H. F. STALDER  2,449,915
INDICATOR ATTACHMENT FOR PLANTERS
Filed Sept. 3, 1947  2 Sheets-Sheet 1
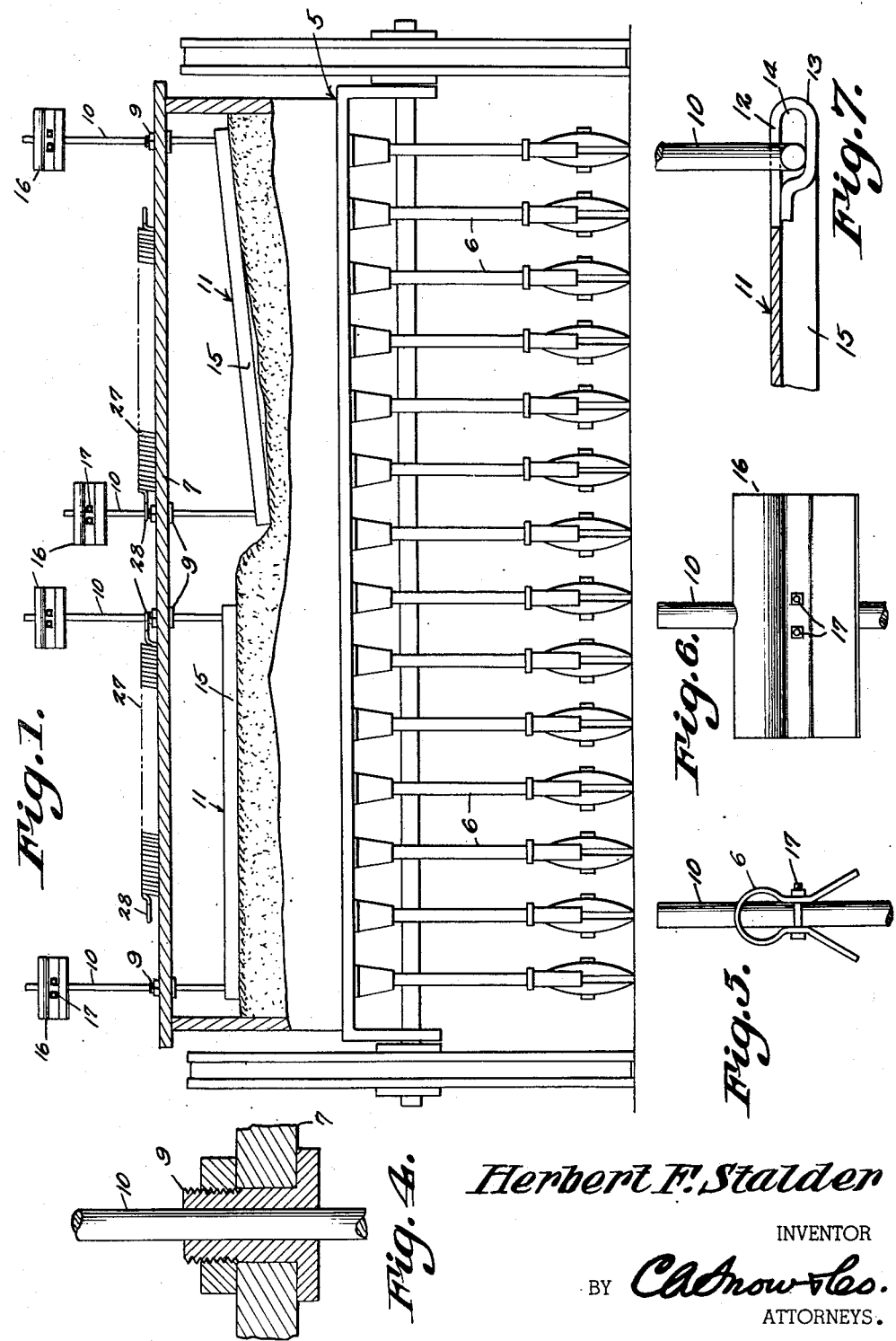
Herbert F. Stalder
INVENTOR

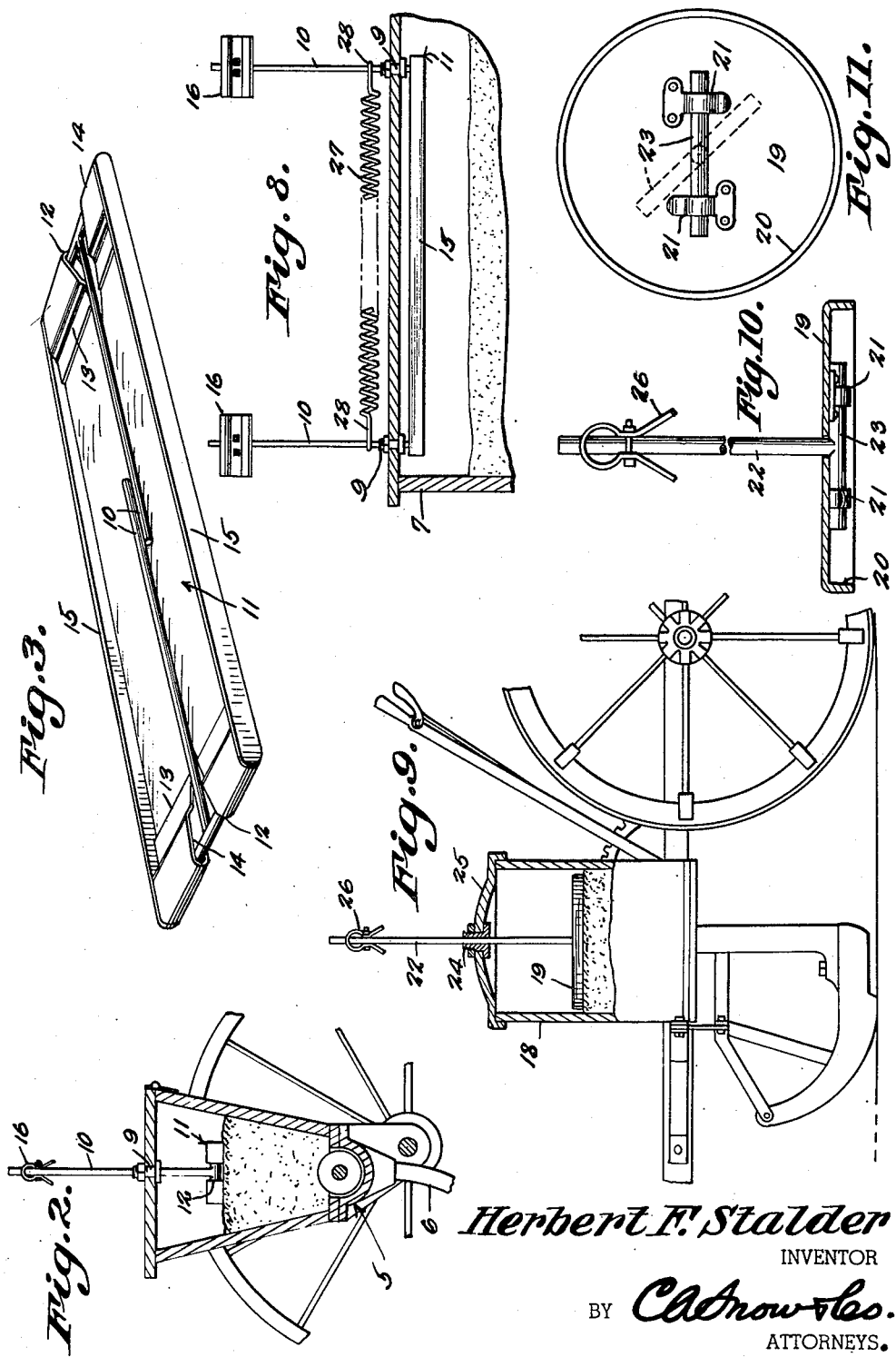

Patented Sept. 21, 1948

2,449,915

UNITED STATES PATENT OFFICE 2,449,915

INDICATOR ATTACHMENT FOR PLANTERS

Herbert F. Stalder, Harper, Kans.

Application September 3, 1947, Serial No. 771,935

4 Claims. (Cl. 116—114)

1

This invention relates to agricultural machines, and more particularly to seeders and planters, the primary object of the invention being to provide an indicator adapted to be positioned within the hoppers of seeders or planters for indicating the quantity of seed held within the hoppers, the indicator being visible by the operator.

Another object of the invention is to provide an indicator which will indicate when certain of the drill tubes have become clogged, to prevent the passage of seed or fertilizer material therethrough, thereby insuring against the operation of the machine which would otherwise result in portions of the field being unplanted.

A further object of the invention is to provide a gauge which is adjustable along the indicator, regulating the movements of the indicator.

Still another object of the invention is to provide an indicator which may be folded into a small and compact article for storing away when not in use.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a rear elevational view of a grain drill, the hopper thereof being partly broken away illustrating the position of the indicator with respect to the grain or fertilizer contained within the hopper.

Figure 2 is a vertical sectional view through the hopper of the grain drill, illustrating the indicator as positioned therein.

Figure 3 is a perspective view of the follower plate, forming a part of the indicator, the indicating rods being moved to their folded positions against the bottom of the follower plate.

Figure 4 is a vertical sectional view through a bushing through which the indicator rods move.

Figure 5 is an elevational view illustrating the adjustable stop on one of the indicating rods.

Figure 6 is an elevational view taken at right angles to Figure 5.

Figure 7 is an enlarged fragmental sectional

2 view illustrating the pivotal connection between the follower plate and indicator rod of the device.

Figure 8 is a fragmental elevational view through a seed hopper of a planter or drill, illustrating the follower as secured in its inactive position.

Figure 9 is an elevational view of a planter, the seed box thereof being shown partially in section, illustrating a modified form of the invention.

Figure 10 is a sectional view through the modified form of seed follower as used with this type of planter.

Figure 11 is a bottom plan view of the follower plate illustrating the detachable indicator rod as connected therewith, the dotted line position of the rod illustrating the manner of disconnecting the rod from this form of plate.

Referring to the drawings in detail, the reference character 5 indicates generally a seed or fertilizer drill which is supplied with the usual drill tubes 6 that are fed with seed or fertilizer, from the hopper 7, in the usual and well known manner.

The hopper 7 is provided with the usual hinged closure, which closure is provided with openings for the reception of the bushings 9, forming a part of the indicator, the bushings accommodating the indicator rods 10, which move therethrough by gravity.

The indicator rods are of T-shape construction, and have pivotal connection with the follower plates associated therewith, each of the follower plates embodying a main section 11 of a width to fit within the hopper of the seeder or planter, the plates each having cut out portions 12 in their ends, providing extensions 13 that are bent rearwardly providing elongated bearings 14 for the T-shaped rods.

The longitudinal side edges of the plate 11 are extended downwardly, providing flanges 15 that embed themselves in the seed or fertilizer being planted to retard movement of the follower plate and prevent the follower plate from moving through the grain or fertilizer during the planting operation. This construction permits the plate to pivot from one of the indicator rods, while the opposite end of the plate swings downwardly, as shown by Figure 1 of the drawings.

This condition occurs when one or more drill tubes become clogged to prevent the passage of material therethrough. As this condition arises, the operator will readily see that one indicator rod is elevated above the other and may immediately eliminate irregular planting of the surface over which the machine is moving. As clearly shown by the drawings, there is an indicator rod at each end of each follower plate, and in many instances, two or more of these follower plates are used, according to the length of the hopper. On each indicator rod is an adjustable stop 16, each stop comprising preferably a length of sheet metal material bent upon itself and formed with an opening to accommodate the indicator rod, the adjustable stop having its sides bent outwardly, as clearly shown by Figure 5 of the drawings so that rain or moisture falling thereon will be directed away from the indicator rod to insure against moisture entering the hopper, along the indicator rod.

These adjustable stops are secured in their positions of adjustment along the indicator rods, by means of the bolts 17, which pass therethrough and draw the sides of the adjustable stops into close contact with the rods.

These stops may be adjusted along the rods to limit the downward movement of the indicator rods to indicate when the supply of material being planted is becoming low in the hoppers, thereby giving ample time to the operator to refill the hoppers before proceeding with the planting operation.

In the form of the invention as shown by Figure 9 of the drawings, I have illustrated the principle of the invention as being carried out in connection with the usual row seed planter. In this form of the invention the seed box is indicated by the reference character 18 and is usually circular in cross section. The follower plate in this form of the invention is indicated by the reference character 19 and is also circular to conform with the shape of the seed box, the plate being formed with a downwardly extended flange 20 that embeds itself in the material being planted, to retard downward movement of the plate. Oppositely disposed clips 21 are secured to the bottom of the follower plate 19, and this plate is formed with a central opening through which the indicator rod 22 extends, the cross arm 23 of the indicator rod being forced under the clips 21 by positioning the rod as shown in dotted lines in Figure 11 of the drawings, then twisting the rod to the full line position shown in Figure 11. The rod in use extends through the bushing 24 positioned in an opening formed in the cover 25 of the seed box. The adjustable stop 26, which is identical in construction with the adjustable stop 16, as previously described, is mounted on the rod 22 to limit the downward movement of the follower plate in this form of the invention.

Should it be desired to remove the indicator from this type of planter, it is only necessary to rotate the indicator rod 22, slightly disengaging the cross arm and clips 21. The rod may now be removed or disconnected from the plate to facilitate storing of the indicator.

In order that the indicator may be held in its inactive position when used on the seed or fertilizer drill as shown by Figure 1 of the drawings, it is contemplated to provide coiled springs, such as indicated by the numeral 27, the springs having eyes at one of their ends for securing the springs to certain rods 16, the opposite ends of the springs having hooks 28 adapted to be hooked over the adjacent indicator rods, setting up a binding action between the rods and their bushings to hold the rods against downward movement, as indicated by Figure 8 of the drawings.

From the foregoing it will be seen that due to the construction shown and described, a fertilizer or seed drill equipped with an indicator such as described, may be operated and the operator may readily determine approximately the quantity of seed or fertilizer in the hopper at all times. When the indicators reach a low position with respect to the top of the seeder or planter, the operator will note at a glance that the contents of the hopper should be replenished.

Should one end of the follower plate become lower than the opposite end, due to certain of the drill tubes being clogged, this condition will be immediately indicated due to the fact that one indicator rod will be slightly elevated above the other as shown at the right of Figure 1 of the drawing. The operator may immediately stop the machine and correct this condition by removing the stoppage in the drills which have not been receiving the fertilizer or seed due to this stoppage.

From the foregoing it is believed that due to the construction shown and described the operation and construction of applicant's invention will be clearly obvious and that a further detailed description as to the operation of the device will be unnecessary.

I claim:

1. The combination with a planter and hopper thereof having a cover, of an indicator indicating the level of the quantity of material within the hopper, said indicator embodying a follower plate, indicator rods pivotally and slidably connected to the ends of the follower plate, said cover having openings through which the rods extend above the cover visible to the operator of the planter, said rods indicating the level of the material within the hopper, and stops adjustably mounted on the indicator rods, said stops adapted to engage the hopper restricting downward movement of the rods, including the quantity of material in the hopper.

2. The combination with a planter and hopper thereof having a cover, of an indicator indicating the level of the quantity of material within the hopper, said indicator embodying a follower plate, indicator rods pivotally and slidably connected to the ends of the follower plate, said cover having openings through which the rods extend above the cover visible to the operator of the planter, said rods indicating the level of the material within the hopper, and stops adjustably mounted on the indicator rods, each stop including outwardly extended rain guards adapted to direct moisture laterally of the rods.

3. The combination with a planter and hopper thereof having a cover, of an indicator indicating the quantity of material within the hopper, comprising an elongated follower plate resting on the surface of the material within the hopper, flanges extending downwardly from the follower plate and embedded in the material within the hopper, said follower plate having cut-out portions extending inwardly from the ends thereof, indicator rods positioned within the cut-out portions, means for pivotally mounting the rods within the cut-out portions, said rods being extended through the openings of the cover and visible to the operator of the planter, said follower plate and rods adapted to move with the variation of the quantity of material within the hopper.

4. The combination with a planter and hopper thereof, having a cover, of an indicator indicating the quantity of material within the hopper, comprising an elongated follower plate, positioned within the hopper, the ends of said plate having cut-out portions extending inwardly, T-shaped indicating rods having their T-shaped ends positioned within the cut-out portions of the follower plate, portions of the follower plate extending around the T-shaped ends of the indicator rods, pivotally and slidably mounting the indicator rods within the cut-out portions, said indicator rods being extended through openings in the cover where they are visible to the operator, said rods indicating the level of the material within the hopper.

HERBERT F. STALDER.

REFERENCES CITED

The following references are of record in the file of this patent:

UNITED STATES PATENTS

| Number | Name | Date |
|---|---|---|
| 109,283 | Wilson | Nov. 15, 1870 |
| 270,021 | Cole | Jan. 2, 1883 |
| 595,320 | Long | Dec. 14, 1897 |
| 1,140,080 | Speer | May 18, 1915 |
| 1,662,484 | Wright | Mar. 13, 1928 |